United States Patent [19]

Weiser

[11] 4,367,568
[45] Jan. 11, 1983

[54] ANCHORAGE DEVICES FOR A TENSION WIRE BUNDLE OF TENSION WIRES

[75] Inventor: Martin Weiser, Cologne, Fed. Rep. of Germany

[73] Assignee: Strabag Bau-AG, Cologne, Fed. Rep. of Germany

[21] Appl. No.: 265,354

[22] Filed: May 20, 1981

[30] Foreign Application Priority Data

May 24, 1980 [DE] Fed. Rep. of Germany ....... 3019978
May 8, 1981 [DE] Fed. Rep. of Germany ....... 3118220

[51] Int. Cl.³ .......................... E04C 5/12; F16G 11/00
[52] U.S. Cl. .................................. 24/122.6; 52/223 L; 52/223 R; 52/230; 403/367; 403/373; 403/374
[58] Field of Search ............ 24/115 R, 115 M, 136 B, 24/136 R, 135 R, 122.6; 403/369, 367, 373, 374; 52/223 L, 230, 223 R

[56] References Cited

U.S. PATENT DOCUMENTS

| 2,737,802 | 3/1956 | Bakker | 52/230 |
|---|---|---|---|
| 2,751,660 | 6/1956 | Nakonz | 52/230 |
| 3,522,682 | 8/1970 | Howlett et al. | 24/122.6 |
| 3,822,442 | 7/1974 | Herbshleb | 24/122.6 |
| 3,863,302 | 2/1975 | Welbergen et al. | 403/374 |
| 3,879,147 | 4/1975 | Morell | 24/115 M |
| 3,952,377 | 4/1976 | Morell | 24/136 R |
| 3,956,797 | 5/1976 | Brandestini | 24/136 R |
| 3,973,297 | 8/1976 | Bruinette | 24/136 B |
| 4,023,242 | 5/1977 | CaroRoqueta | 24/122.6 |
| 4,121,395 | 10/1978 | Rudolf | 24/122.6 |

FOREIGN PATENT DOCUMENTS

| 1464818 | 00/1967 | France. |
|---|---|---|
| 1037690 | 7/1959 | Fed. Rep. of Germany . |
| 1091309 | 4/1961 | Fed. Rep. of Germany. |
| 1258064 | 9/1970 | Fed. Rep. of Germany . |
| 1962726 | 11/1975 | Fed. Rep. of Germany . |
| 2515423 | 11/1975 | Fed. Rep. of Germany . |
| 2932809 | 3/1981 | Fed. Rep. of Germany. |
| 7508587 | 9/1976 | Fed. Rep. of Germany . |
| 1966635 | 11/1979 | Fed. Rep. of Germany . |
| 476903 | 9/1969 | Switzerland. |
| 730702 | 5/1955 | United Kingdom. |

Primary Examiner—Gene Mancene
Assistant Examiner—Kris Schulze
Attorney, Agent, or Firm—Meyer, Tilberry & Body

[57] ABSTRACT

An anchorage device for a tension wire bundle of tension wires made of composite fibre materials, which are arranged in a plurality of layers. The tension wire layers are clamped between clamping plates non-slidable in the traction direction. The tension wire layer is clamped between two wedges slidable in the longitudinal direction. With this arrangement, the longitudinally slidable tension wire layer is clamped so that the tractive force acting in it is transmitted practically over its total circumference through the clamping elements to the wedges.

19 Claims, 10 Drawing Figures

ANCHORAGE DEVICES FOR A TENSION WIRE BUNDLE OF TENSION WIRES

FIELD OF THE INVENTION

The present invention relates to an anchorage device for a tension wire bundle of tension wires, particularly made of composite fibre materials such as synthetic resin bonded glass fibres or carbon fibres, which are arranged in a plurality of tension wire layers between clamping surfaces and are clamped by at least one clamping wedge between abutment elements.

DESCRIPTION OF THE PRIOR ART

A clamping anchorage device for tension wire bundles of this type is disclosed in German Pat. No. 1,037,690. In this arrangement the required clamping pressure to anchor the tension wire layers between the abutment elements is generated by flat wedges. After tensioning, the flat wedges are driven in between the abutments and the tensioned tension wire bundle and abut against a shoulder of the abutment elements. Consequently the clamping wedges cannot readjust themselves automatically, so that failure of the anchorage device is not impossible if the tension wires are subjected to a transverse contraction under the influence of increased tractive forces.

An anchorage device for a tension wire bundle is also already known, wherein a plurality of tension wire layers are mutually separated by plane parallel clamping plates, and wherein the clamping pressure is exerted upon the tension wires by tightening a high tensile screw. One of the clamping plates is wedge-shaped and slidable in the traction direction. It can therefore be entrained by the tension wire layers if the latter undergo a transverse contraction due to increasing longitudinal traction and begin to slip. If all the tension wire layers now slide with the clamping plates, their tractive force transmitted to the wedge may generate such a high wedge transverse pressure that tension wires made of composite fibre materials are crushed, because such composite fibre materials, in contrast to steel, are highly pressure-sensitive transversely to their longitudinal direction. On the other hand, if only the tension wire layer adjacent to the wedge-shaped clamping plate slides together with the wedge, then the tension wires abutting the wedge-shaped clamping plate are subjected to a particularly high shearing stress in the longitudinal direction, because they have on the one hand to entrain the wedge-shaped clamping plate, and on the other hand to slide along the opposite clamping plate under the increasing transverse pressure. Such stresses also cannot be absorbed by tension wires made of composite fibre materials.

SUMMARY OF THE INVENTION

It is an object of the present invention to develop an anchorage device for a tension wire bundle of tension wires sensitive to transverse pressure, particularly of tension wires made of composite fibre materials, such as glass fibres or carbon fibres embedded in plastic or synthetic resin and stuck together, wherein the clamping pressure upon the tension wires between the abutment elements is controlled as a function of the tractive force in the tension wires so that it increases with increasing tractive force, but does not exceed a certain maximum value which is determined by the material characteristics, particularly the sensitivity to transverse pressure, of the tension wires, and that furthermore no tension wire is subjected to a thrust force or shear force in its longitudinal direction.

The anchorage device in accordance with the present invention achieves this object by providing: at least one tension wire layer arranged between clamping surfaces non-slidable in the traction direction; at least one other tension wire layer between clamping forces slidable in the traction direction; and at least one slidable clamping surface belonging to a clamping wedge which is controlled by the tractive force of the tension wire layer tensioned between the slidable clamping surfaces.

This development has the advantage that only a clamping force proportional to the tractive force of the tension wire layers enclosed by the clamping wedges is exerted upon all the tension wires in the anchorage region, and is adapted to the material characteristics of the tension wires so that they are not crushed. Although the tension wires tensioned between the non-slidable clamping surfaces also take their share of the tensioning force to be absorbed by the tension wire bundle, they do not participate in the generation of the clamping pressure necessary for the anchorage.

Because the clamping wedge or the clamping wedges readjust themselves automatically in the case of slipping of the tension wires due to a transverse contraction, it is unnecessary to secure them against falling out. It is also unnecessary for any clamping pressure to be exerted upon the clamping plates from the outside, so that the anchorage means can be sunk fireproof in the concrete structure from the outset.

In one preferred form each slidable clamping surface either belongs to a clamping wedge or is connected to at least one clamping wedge positively in the traction direction of the tension wires. It is thereby achieved that during the transfer of the tractive force from the slidable tension wire layer or layers to the wedge or wedges, no tension wire is subjected to a shearing stress in the longitudinal direction, because there are no relative movements between the clamping wedges and the clamping plates, possibly provided slidably, on the one hand, and the tension wires located between then, and the tractive force in the tension wires in both the mutually opposite slidable clamping surfaces is transmitted either directly or indirectly but positively to a clamping wedge. For example, if a tension wire layer is tensioned between the clamping surfaces of two flat clamping wedges and is longitudinally slidable therewith with reference to the abutment elements and to the non-slidably clamped tension wire layers, both clamping wedges are jointly controlled by the tractive force of the tension wire layer enclosed between them, and no relative movement between the clamping wedges and the tension wires located between them occurs.

It is particularly convenient if the clamping wedges abut by their mutually remote oblique wedge surfaces against sliding surfaces, adjacent to them, of non-slidable clamping plates or abutment elements. They can then easily slide along on these surfaces without exerting forces upon adjacent tension wire layers in their longitudinal direction. In order to facilitate the sliding, a lubricant layer may also be arranged between the wedge surfaces and the surfaces, adjacent thereto, of the clamping plates or abutment elements.

Because the interlaminar shear strength of the tension wires made of composite fibre materials is very much lower than their longitudinal tensile strength, the anchorage length of the tension wires in the region of the abutment must be very much greater than for tension wires made of steel, because the introduction of the tractive forces from the surface of the tension wires towards their centre occurs with the aid of such interlaminar shear stresses. In order to keep the anchorage length within tolerable limits, it is convenient to distribute the shear stresses uniformly over the entire cross-section of each individual tension wire. It is also important not to allow the clamping pressure to become too high in the case of the tension wires sensitive to transverse pressure. It is therefore preferable to use clamping wedges with a flat wedge angle. To avoid making these too thick with their great required anchorage length, it is advantageous if the mutually remote wedge surfaces of the clamping wedges and the sliding surfaces, adjacent to these wedge surfaces, of the non-slidable clamping plates, against which the flat wedges are braced, are stepped in sawtooth formation. By this means it is possible to reduce the overall thickness of the clamping wedges considerably.

It is also convenient if the clamping plates and/or clamping wedges exhibit incisions directed at right angles to the tension wire direction in order to reduce their longitudinal rigidity. The clamping plates and/or clamping wedges may also consist of a plurality of separate plates arranged consecutively in the longitudinal direction.

In order to increase the clamping force, a plurality of tension wire layers which are mutually separated by flat parallel clamping plates or flat wedge plates slidable longitudinally with reference to the abutment elements may be arranged between the clamping wedges. A plurality of layers of tension wires then participate simultaneously in controlling the tractive force. The wedge effect and hence also the clamping pressure is simultaneously increased by the flat wedge plates.

In order to prevent crushing of tension wires sensitive to transverse pressure, e.g., glass fibre bundles, it is preferable that the clamping surfaces of clamping plates, clamping wedges and abutment elements exhibit longitudinal grooves which at least partly embrace the tension wires. It is thereby possible to distribute the clamping pressure highly uniformly over the circumference of the tension wires and largely to avoid crushing deformation.

Shims may be fitted to the surfaces of the longitudinal grooves for better adaptation to the tension wires. These shims preferably consist of a soft metal, preferably of lead, or of a synthetic resin, preferably of a glass fibre reinforced synthetic resin.

The abutment elements may be parts of a closed frame which is braced against the structure and encloses the clamping plates and flat wedge plates with the tension wire layers arranged between them.

In another preferred form it is also possible to connect the abutment elements by high tensile screw bolts, installed untensioned, which are tensioned by driving in the flat wedge plates. Since no retensioning of these screw bolts is necessary, they may be sunk in the concrete structure from the outset.

If each slidable clamping surface which does not belong to a clamping wedge is connected to a clamping wedge in the direction of tractive force by intermeshing parts, then it is unnecessary to provide two flat clamping wedges arranged in the same sense, and a single wedge, which is coupled to one or more longitudinally slidable flat parallel clamping plates, which enclose between them the tension wire layers utilized for controlling the clamping wedge, is sufficient. Since the flat parallel clamping plates can be very thin, scarcely any spreading of the tension wire layers occurs. It is also possible to shift the wedge from the centre to the edge of the tension wire bundle, where its wedge surface co-operates with a wedge surface arranged directly on the abutment element. By this means none of the tension wire layers is deflected out of its parallel position to the other tension wire layers in the anchorage region.

It is further preferable that at least one of the slidable clamping surfaces is arranged on a longitudinally slidable, flat parallel clamping plate which is coupled to at least one clamping wedge by projecting parts which do not obstruct the reciprocal movement of clamping plate and clamping wedge in the clamping direction. In order to obtain the desired coupling, the flat parallel clamping plate may be provided at its rear end in the traction direction with at least one claw which engages behind the rear end face of a clamping wedge.

It is still further preferable that the flat parallel clamping plate and at least one clamping wedge intermesh by a toothed system. By this means the rear end faces, confronting the tensioning press, are left free of wedges and clamping plates, so that the tensioning stroke is not reduced.

The toothed system in clamping wedge and clamping plate is preferably arranged beside and/or between the tension wires of the relevant tension wire layer. By this means it establishes the connection between clamping wedge and clamping plate over a large surface, without obstructing the sliding mobility of these parts transversely and at right angles to the tension wire longitudinal direction. The clamping effect is not prejudiced by this, and the tension wires can unconstrainedly enter the longitudinal grooves arranged in the clamping plates and clamping wedges, without any singular crushing load occurring.

BRIEF DESCRIPTION OF THE DRAWINGS

The present invention will now be described in greater detail by way of example with reference to the accompanying drawings, wherein.

DESCRIPTION OF THE PREFERRED EMBODIMENTS

Figure 1:
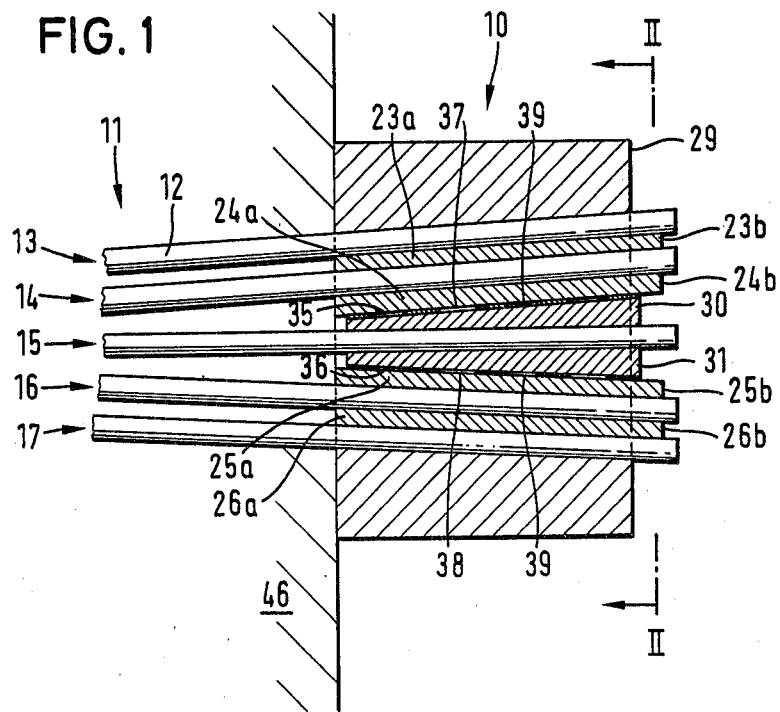
FIG. 1 is a longitudinal section of one preferred form of an anchorage device for a tension wire bundle.

Referring to the drawings, the anchorage device 10 for a tension wire bundle 11, is in the form of a tension element for prestressing components made of concrete or other materials. Tension wires 12 consist of a composite fibre material, e.g., of bundles of glass fibres which may be stuck together by a suitable plastic or otherwise connected together. The tension wires 12 may also be high tensile sythetic resin bonded carbon fibres.

In the embodiments illustrated in FIGS. 1 to 6, the tension wires 12 are arranged in five superimposed tension wire layers 13 to 17 between abutment elements 19 and 20, which in the embodiments shown in FIGS. 1 to 4 are parts of a closed steel frame 21. The tension wire layers 13 to 17 are threaded through the aperture 22 in the abutment frame 21 and separated mutually by clamping plates 23, 24, 25 and 26 of uniform thickness. The clamping plates 23 to 26 are T-shaped in plan and have their narrower rear parts 23a, 24a, 25a and 26a adapted to the width of the aperture 22 in the abutment frame 21, whilst their front wider head parts 23b, 24b, 25b and 26b overlap lateral bars 27 and 28 of the abutment frame 21 at the front side 29 thereof.

The central layer 15 of the tension wires 12 is tensioned between two flat clamping wedges 30 and 31 arranged in the same sense, which exhibit on their mutually confronting wedge surfaces 32 and 33 longitudinal grooves 34 which embrace the tension wires 12 of the tension wire layer 15. Similarly, the clamping plates 23 to 26 and the abutment elements 19 and 20 are also equipped with longitudinal grooves 34 which lie mutually opposite in pairs and receive the tension wires 12 of the tension wire layers 13, 14, 16 and 17.

Figure 2:
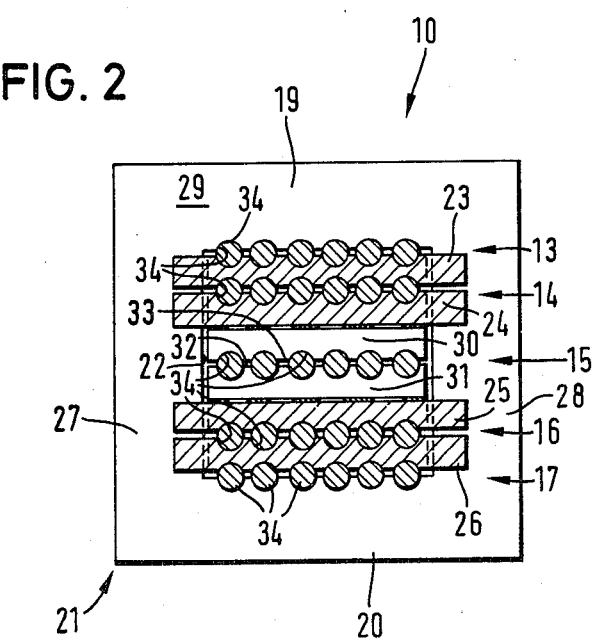
FIG. 2 is a cross sectional view of the anchorage device shown in FIG. 1 taken along the line II—II.

It will be clear from FIGS. 1 and 2 that the clamping wedges 30 and 31 have a rectangular shape in plan and are narrower than the aperture 22 in the abutment frame 21. The clamping wedges 30 and 31 abut with their wedge surfaces 35 and 36 remote from the tension wires 12 of the tension wire layer 15 against the adjacent sliding surfaces 37 and 38 of the clamping plates 24 and 25 and are longitudinally slidable between these clamping plates. A lubricant layer 39 is also arranged between these wedge surfaces 35 and 36 and the adjacent surfaces 37 and 38 of the clamping plates 24 and 25.

Figure 3:
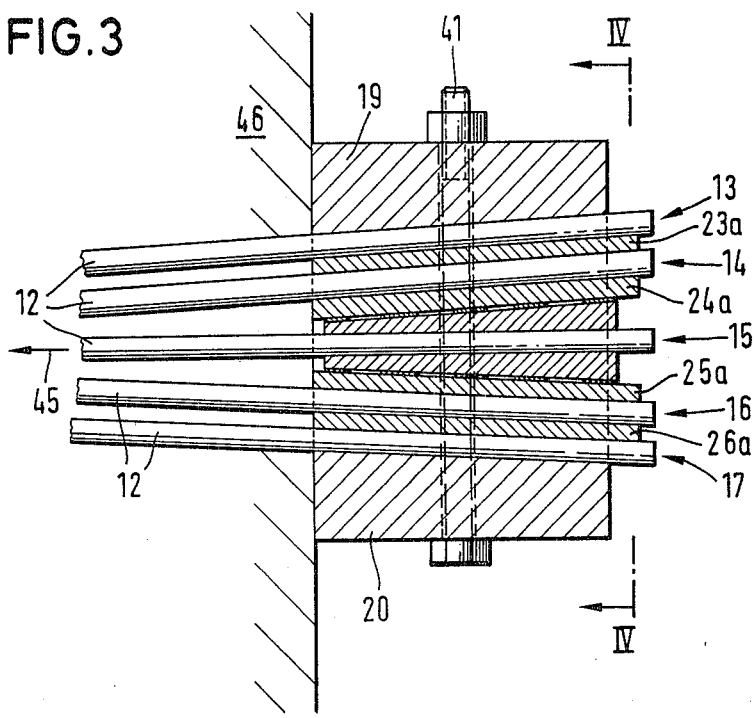
FIG. 3 is a longitudinal section of a second embodiment of an anchorage device.
Figure 4:
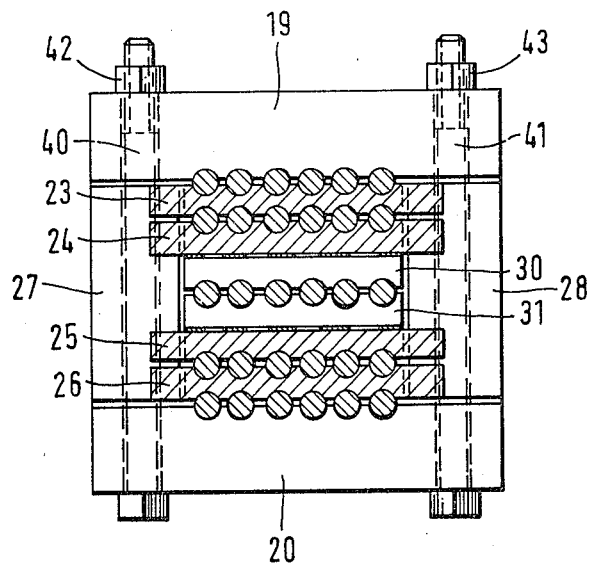
FIG. 4 is a cross sectional view of the anchorage device shown in FIG. 3 taken along the line IV—IV.

In the second embodiment illustrated in FIGS. 3 and 4 the abutment elements 19 and 20, and the side parts 27 and 28, are separate parts which are mutually connected by two high tensile screw bolts 40 and 41. The screw bolts 40 and 41 are installed untensioned with their respective nuts 42 and 43 and are tensioned only by driving in the clamping wedges 30 and 31.

After being tensioned, the tension wires 12 are first of all clamped by driving in the clamping wedges 30 and 31 between the clamping plates 23 to 26 and the abutment elements 19 and 20, and thereby anchored. If during this, and subsequently under load, the tractive force in the tension wires 12 increases and the tension wires are thereby subjected to a transverse contraction and begin to slip, the tension wires 12 of the tension wire layer 15 entrain the clamping wedges 30 and 31 in the traction direction 45. An increased clamping pressure is thereby exerted upon the clamping plates 23 to 26 and the tension wire layers 13, 14, 16 and 17 located between them and the abutment elements 19 and 20, and also upon the tension wire layer 15 located between the clamping wedges 30 and 31. This ensures the anchorage between the abutment elements 19 and 20 towards a concrete structure 46.

Figure 5:
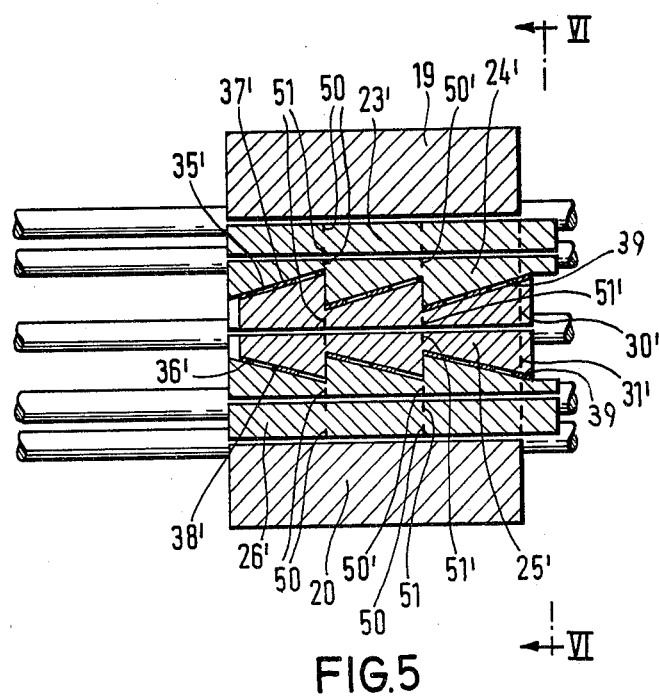
FIG. 5 is a longitudinal section of a modified form of the anchorage device shown in FIG. 1.
Figure 6:
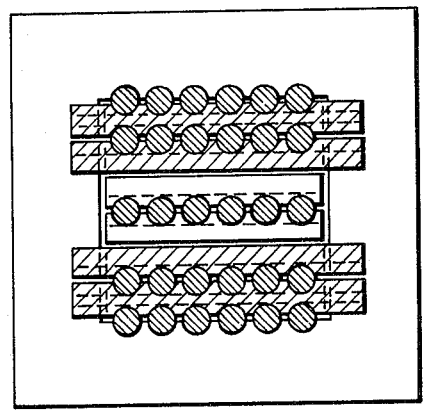
FIG. 6 is a cross sectional view of the anchorage device shown in FIG. 5 taken along the line VI—VI.

Referring now to the modified form of the first embodiment shown in FIGS. 5 and 6, the clamping wedges 30' and 31' are stepped in sawtooth formation on their mutually remote wedge surfaces 35' and 36'. Likewise, the surfaces 37' and 38', adjacent to the respective surfaces 35' and 36' of the non-slidable clamping plates 24' and 25' are also stepped in sawtooth formation. In this development even a comparatively slight longitudinal sliding of the flat wedge plates 30' and 31' with reference to the clamping plates 24' and 25' adjacent to them is sufficient to obtain an intensive increase in the clamping effect.

As will be seen from FIG. 5, the clamping plates 23' to 26' which are placed closest to the abutment elements 19 and 20 are also provided on their mutually opposite flat sides with incisions 50 and 51 directed at right angles to the longitudinal axis of the tension wires. The clamping plates 23' to 26' are weakened by these incisions, so that they become more flexible and lose much of their longitudinal rigidity. In a further alternative form the clamping plates 23' to 26' consist of a plurality of separate plates arranged consecutively in the longitudinal direction.

In another modified form, the flat wedge plates are also provided with incisions 50' and 51' or subdivided into a plurality of consecutively arranged individual plates, as shown in FIG. 5.

Figure 7:
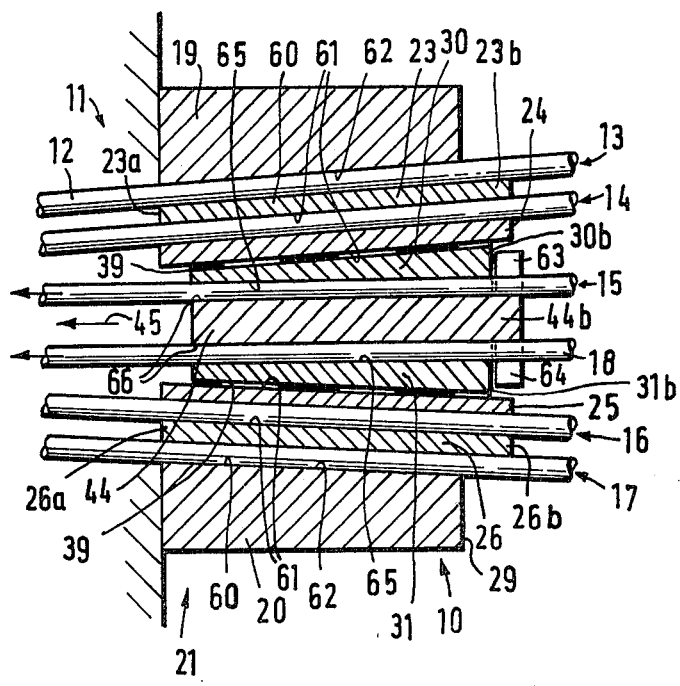
FIG. 7 is a longitudinal section of a third embodiment of the anchorage device.

In the third embodiment shown in FIG. 7, it will be seen that there are six tension wires 13 to 18 and not five as in the previous embodiments. The two tension wire layers 15 and 18, which are mutually separated by a flat parallel clamping plate 44, are arranged between the clamping wedges 30 and 31. This flat parallel clamping plate 44 has the same shape in plan as the flat clamping wedges 30 and 31 and is also slidable in the longitudinal direction of the tension wires 12 in the aperture 22 of the abutment element frame 21.

Thus the two central tension wire layers 15 and 18 are mutually separated by a plane parallel clamping plate 44 and are braced with reference to the outer tension wire layers 13 and 14 on the one hand and 16 and 17 on the other hand, in each case by a flat clamping wedge 30 or 31, the oblique wedge surface of which abuts against a plane parallel clamping plate 24 or 25 which has the same T-shaped plan as the clamping plates 23 and 26, and of which the clamping plate 24 is arranged beneath the tension wire layer 14 and the clamping plate 25 above the tension wire layer 16. A slip layer or a lubricant film 39, which ensures easy longitudinal sliding mobility of the wedges 30 and 31 upon the non-slidable clamping surfaces 61 of the clamping plates 24 and 25 is present between non-slidable clamping surfaces 61 confronting the clamping wedges 30 and 31, and the oblique surfaces of the wedges 30 and 31.

The central clamping plate 44, which is arranged between the two tension wire layers 15 and 18, is provided at its rear end 44b in the traction direction 45 with an upwardly directed claw 63 and with a downwardly directed claw 64. The upper claw 63 engages behind the rear end face 30b of the upper clamping wedge 30, and the lower claw 64 engages behind the rear end face 31b of the lower wedge 31. The central clamping plate 44 is thereby coupled in the direction 45 with both clamping wedges 30 and 31, so that the tractive forces acting in the tension wire layers 15 and 18 are transmitted on two mutually opposite sides to the slidable clamping surfaces 65 of the clamping wedges 30 and 31 on the one hand, and to the slidable clamping surfaces 66 of the clamping plate 44 on the other hand. It will be noted that, although all the tension wire layers 13 to 18 participate in absorbing the tensioning force applied to the tension wire bundle, only the tractive forces acting in the tensioning element layers 15 and 18 generate a clamping pressure upon the tension wire layers in the region of abutment, because they alone are longitudinally slidable jointly with the clamping wedges 30 and 31 and with the clamping plate arranged between the tension wire layers 15 and 18. During this longitudinal sliding the clamping wedges 30 and 31 slide with their inclined wedge surfaces along the non-slidable clamping surfaces 61 of the clamping plates 24 or 25 adjacent to them, whilst the lubricant layer 39 arranged between these surfaces ensures unobstructed movement.

Figure 8:
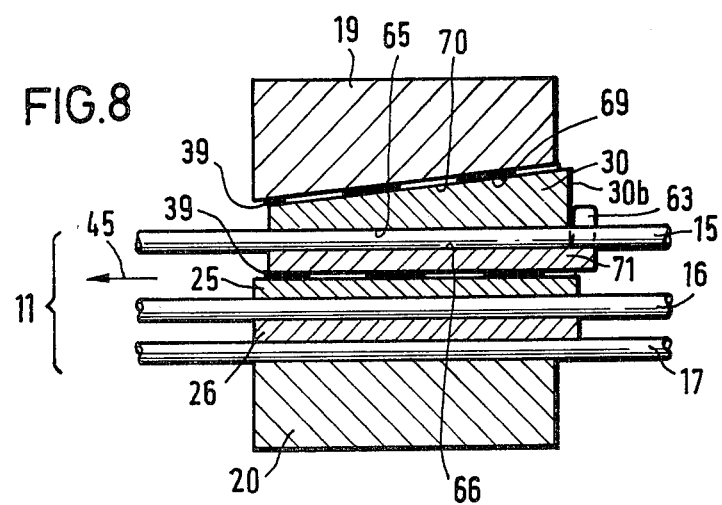
FIG. 8 is a longitudinal section of a fourth embodiment of the anchorage device.

In the fourth embodiment shown in FIG. 8 it will be noted that only three tension wires 15, 16 and 17 are provided and that only one clamping wedge 30 is provided. The clamping wedge 30 is not located in the centre of the tension wire bundle 11, but at its surface, and abuts by its inclined wedge surface 69, with interposition of a lubricant layer 39, against the counter-inclined wedge surface 70 of the upper abutment element 19. The tension wire layer 15 controlling the clamping wedge 30 is tensioned between the clamping wedge 30 and a flat parallel clamping plate 71, which is coupled to the clamping wedge 30 by a claw 63 which engages behind the rear end face 30b of the clamping wedge 30 and thereby transmits the share of the longitudinal tractive force of the tension wire layer 15 which is transmitted to the longitudinally slidable clamping plate 71, to the slidable clamping wedge 30. In order that the clamping plate 71 can move unobstructedly in the direction 45 jointly with the tension wire layer 15 and with the movable clamping wedge 30, a slip layer 39 is likewise provided between it and the non-slidable T-shaped clamping plate 25 arranged beneath it.

The two tension wire layers 16 and 17 are arranged between the non-slidable clamping plate 25 and the lower abutment element 20, and are mutually separated by a further non-slidable clamping plate 26 which, like the clamping plate 25, has a T-shape in plan and is therefore unable to slide in the direction 45.

It will be seen that only the tension wire layer 15 is able to slide in the direction 45 with the clamping wedge 30 and with the slidable clamping plate 71, and to activate a transverse pressure of the wedge. The tension wire layer 15 then remains parallel to the tension wire layers 16 and 17 even in the anchorage region. The spread of the tension wire layers, i.e., their mutual interval from each other, in the anchorage region is also only slight. The mutual interval can optionally be still further reduced if the clamping plates 71 and 25 are made thinner, so that the two together are little or no thicker than the clamping plate 26.

Figure 9:
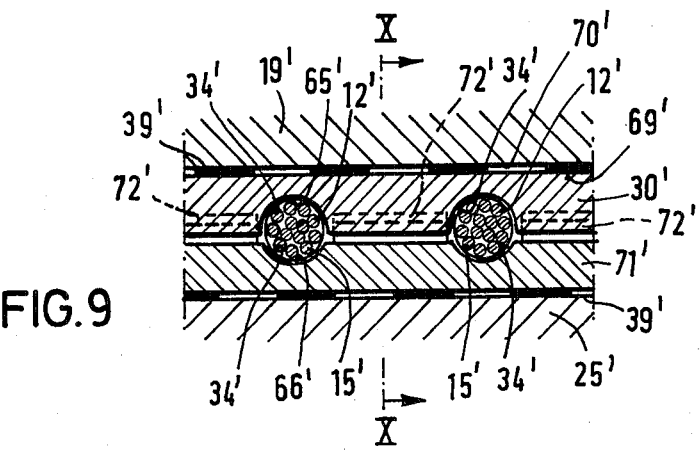
FIG. 9 is a partial cross section of a modified form of the anchorage device shown in FIG. 8.
Figure 10:
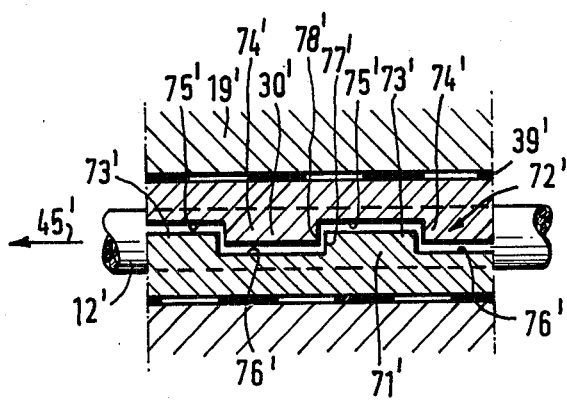
FIG. 10 is a longitudinal section of the anchorage device shown in FIG. 9.

FIGS. 9 and 10 show a modified form of the fourth embodiment, in which the positive connection of the mobile clamping surfaces, arranged on two opposite sides of a mobile tension wire layer, of a wedge and of a clamping plate or of two clamping wedges or two mobile clamping plates, is obtained by the mutually confronting toothed surfaces of these clamping parts.

The arrangement of the clamping wedges and clamping plates, and of the tension wire layers, is analogous to the fourth embodiment illustrated in FIG. 8. The same reference numerals therefore represent the same parts as in the previous embodiments.

The tension wires 12 of the mobile tension wire layer 15 are clamped between an upper clamping wedge 30 and a slidable flat parallel clamping plate 71. The clamping wedge 30 and the clamping plate 71 are provided with longitudinal grooves 34 which are placed mutually opposite in pairs and partly embrace the tension wires 12 at their upper and lower sides. The flat clamping wedge 30 is supported slidably in the direction 45 by its oblique wedge surface 69 on the counter-inclined wedge surface 70 of the upper abutment element 19 with the interposition of a slip layer 39', whilst the slidable clamping plate 71 is supported slidably with reference to a T-shaped non-slidable clamping plate 25 arranged beneath it, with the interposition of a further slip medium layer 39.

As in the previous embodiment the clamping plate 71 is provided at its rear with a claw 63 which engages against the rear face 30b of the clamping wedge 30.

In a modified form, in order to prevent the appearance in the tension wires 12 of the tension wire layer 15 of a shear stress gradient from the slidable clamping surface 65' of the clamping wedge 30 to the slidable clamping surface 66 of the slidable clamping plate 71, the clamping wedge 30' is coupled to the slidable clamping plate 71 by toothed systems.

As shown in FIGS. 9 and 10, where the same reference numerals indicate like parts, except that they carry a raised suffix dash, the toothed system 72' are located laterally between the tension wires 12' of the tension wire layer. It will be seen from FIG. 10 that both the clamping plate 71' and the clamping wedge 30' exhibit parts 73' and 74' respectively projecting between the tension wires 12', which engage in grooves 75' and 76' respective which are arranged in the opposite wedge plate 30' and in the clamping plate 71' respectively. Therefore, in the clamping plate 71' and in the clamping wedge 30', the projections 73' and 74' respectively are followed in the longitudinal direction by grooves 76' and 75' respectively of equal size. The tractive force acting in the tension wires 12', which is transmitted in the clamping surfaces 66' to the flat parallel clamping plate 71', is then passed on by the projections 73' to the projections 74' of the clamping wedge 30', because the front end faces 77' of the projections 73' are braced against the rear end faces 78' of the projections 74'.

Although not illustrated in FIGS. 9 and 10, which show only the detail of the clamping anchorage means with toothed clamping wedges and clamping plates, it will be obvious to the skilled expert that the toothed systems of the slidable clamping surfaces may be arranged not only between the tension wires, but also beside the tension wires of the slidable tension wire layers. It is also possible to combine different types of couplings, so as not only to constrain a simultaneous movement of the parts mutually connecting the tension wire layers, but also to achieve that the longitudinal forces acting in the tension wires are introduced into the wedges symmetrically on both sides of the tension wires, so that no interlaminar shear forces can appear in the individual tension wires.

Finally, it is also possible to provide a plurality of pairs of clamping wedges, or to arrange flat wedges between the tension wire layers enclosed by clamping wedges, instead of the flat parallel plates 44. The anchorage device may equally well also be applied to steel wires or thicker steel bars.

What I claim and desire to secure by Letters Patent is:

1. An anchorage device for a tension wire bundle of tension wires which are arranged in a plurality of tension wire layers between clamping surfaces, said anchorage device including: a rectangular frame defining an aperture; a plurality of non-slidable clamping plates arranged within the aperture; first clamping surfaces arranged between respective clamping plates and the frame for clamping n-1 of the tension wire layers; a pair of slidable clamping wedges arranged within the aperture centrally with respect to the clamping plates; second clamping surfaces between the clamping wedges for clamping the other tension wire layers; and sliding surfaces located on the clamping wedges and adjacent clamping plates.

2. An anchorage device according to claim 1, wherein there are four clamping plates, two on either side of the clamping wedges, the first clamping surfaces being arranged between respective pairs of clamping plates and between the outermost clamping plates and the rectangular frame.

3. An anchorage device according to claim 2, wherein said clamping surfaces comprise longitudinal grooves in the clamping plates, the clamping wedges, and the rectangular frame.

4. An anchorage device according to claim 1, wherein said frame is made up of four separate parts, bolts being provided to hold said parts together.

5. An anchorage device according to claim 1, wherein the sliding surface between the clamping wedges and the adjacent clamping plates are stepped in sawtooth formation.

6. An anchorage device according to claim 1, wherein a lubricant layer is arranged between said sliding surfaces of the clamping wedges and adjacent clamping plates.

7. An anchorage device according to claim 2, wherein the outermost clamping plate adjacent the frame are provided with incisions directed at right angles to the longitudinal axis of the tension wires.

8. An anchorage device according to claim 2, wherein the outermost clamping plates adjacent the frame consist of a plurality of separate clamping plates arranged consecutively in the longitudinal direction.

9. An anchorage device according to claim 3, wherein shims are fitted to the surfaces of the longitudinal grooves.

10. An anchorage device according to claim 9, wherein the material from which said shims are made, is lead.

11. An anchorage device according to claim 9, wherein the material from which said shims are made, is glass fibre reinforced synthetic resin.

12. An anchorage device for a tension wire bundle of tension wires which are arranged in a plurality of tension wire layers between clamping surfaces, said anchorage device including: a rectangular frame defining an aperture; a plurality of non-slidable clamping plates arranged within the aperture; first clamping surfaces arranged between respective clamping plates and the frame for clamping n-2 of the tension wire layers; a pair of slidable clamping wedges; a flat clamping plate positioned between the clamping wedges; second clamping surfaces located on the clamping wedges and the flat clamping plate for clamping the other two tension wires; and sliding surfaces located between the clamping wedges and adjacent clamping plates.

13. An anchorage device according to claim 12, wherein there are four clamping plates, two on either side of the clamping wedges and the centrally arranged flat clamping plate, the first clamping surfaces being arranged between respective pairs of clamping plates and between the outermost clamping plates and the rectangular frame.

14. An anchorage device according to claim 13, wherein said clamping surfaces comprise longitudinal grooves in the clamping plates, the clamping wedges and the rectangular frames.

15. An anchorage device according to claim 13, wherein the flat central clamping plate is provided at one end with a first upwardly directed claw and a second downwardly directed claw, which engage behind the rear faces of respective clamping wedges.

16. An anchorage device for a tension wire bundle of tension wires which are arranged in a plurality of tension wire layers between clamping surfaces, said anchorage device including: a rectangular frame defining an aperture; a plurality of non-slidable clamping plates arranged within the aperture; first clamping surfaces arranged between respective clamping plates and the frame for clamping n-1 of the tension wire layers; a single slidable clamping wedge arranged within the aperture and adjacent one side of the frame; a single slidable clamping plate arranged within the frame between the clamping wedge and one of the non-slidable clamping plates; second clamping surfaces between the slidable clamping plate and the clamping wedge for clamping the other tension wire; and sliding surfaces located on the clamping wedge and the slidable clamping wedge and the slidable clamping plate adjacent the frame and one non-slidable clamping plate respectively.

17. An anchorage device according to claim 16, wherein said slidable clamping plate is provided at its rear end with an upwardly directed claw which engages with the rear face of the clamping wedge.

18. An anchorage device according to claim 16, wherein a toothed system is provided for coupling the clamping wedge to the slidable clamping plate.

19. An anchorage device according to claim 18, wherein said toothed coupling system comprises projections and grooves of equal sizes on the respective surfaces of the clamping wedge and clamping plate.

* * * * *